United States Patent [19]

Frömel et al.

[11] 4,125,434
[45] Nov. 14, 1978

[54] NUCLEAR REACTOR-FUEL ELEMENT

[75] Inventors: Gustav Frömel; Peter Suchy, both of Erlangen; Gerhard Ulrych, Tennenlohe, all of Germany

[73] Assignee: Kraftwerk Union Aktiengesellschaft, Mulheim (Ruhr), Germany

[21] Appl. No.: 760,357

[22] Filed: Jan. 19, 1977

[30] Foreign Application Priority Data

Jan. 21, 1976 [DE] Fed. Rep. of Germany ....... 2602124

[51] Int. Cl.² .................................................. G21C 3/02
[52] U.S. Cl. ..................................... 176/76; 176/78
[58] Field of Search .............................. 176/68, 76, 78

[56] References Cited

U.S. PATENT DOCUMENTS

| 3,049,485 | 8/1962 | Tatlock et al. | 176/76 X |
|---|---|---|---|
| 3,589,438 | 6/1971 | Boorman et al. | 176/78 X |
| 3,663,367 | 5/1972 | Calvin | 176/78 |
| 3,764,470 | 10/1973 | Calvin | 176/78 X |
| 3,787,286 | 1/1974 | Anthony | 176/78 |
| 3,814,666 | 6/1974 | Calvin | 176/78 |
| 3,844,888 | 10/1974 | Calvin | 176/78 |
| 3,847,736 | 11/1974 | Bevilacqua | 176/78 |
| 3,862,000 | 1/1975 | Pugh et al. | 176/78 |
| 3,920,516 | 11/1975 | Kmonk et al. | 176/78 |
| 3,997,394 | 12/1976 | Aisch et al. | 176/76 X |

*Primary Examiner*—Peter A. Nelson
*Attorney, Agent, or Firm*—Herbert L. Lerner

[57] ABSTRACT

A nuclear reactor-fuel element with cylindrical fuel rods and a fuel element skeleton formed of a head and foot member and cylindrical control rod-guide tubes connecting the members includes a plurality of mesh-forming spacing holder-grids for the fuel rods fastened to the guide tubes, the control rod-guide tubes being received respectively in the mesh formed by the spacing holder-grids, and flow guide means in vicinity of at least one of the spacing holder-grids largely closing, from a flow-technology standpoint, the cross section of the respective mesh surrounding the guide tube received therein.

9 Claims, 6 Drawing Figures

NUCLEAR REACTOR-FUEL ELEMENT

The invention relates to a nuclear reactor-fuel element with cylindrical fuel rods and a fuel element skeleton formed of a head and a foot member and cylindrical control rod-guide tubes connecting the members, a plurality of spacing holder-grid members for the fuel rods fastened to the guide tubes, the holder-grid members forming mesh openings especially of rectangular cross section, the holder-grid members having flow guiding devices.

Such flow guiding devices are described, for example, in U.S. Pat. No. 3,379,619. They have the function of guiding the flow ribbons or filaments of cooling liquid passing through the fuel element in longitudinal direction so that they cover a very large area of the fuel element cross section, for example, by providing a helical path therefor. Nonuniformities over the fuel element-cross section, which may be present with regard to heat removal from the fuel rods and heating of the coolant, are supposed to be compensated for or balanced thereby.

The flow guiding devices are generally vanes that are provided at the spacer-grid member and extend in varying directions so that the flow ribbons or filaments are correspondingly laterally diverted.

It is also an object of the invention of the instant application to provide a nuclear reactor-fuel element of the foregoing general type with means for compensating for or equalizing the heating of the coolant as it flows through the fuel element. A further object of the invention, however, is to provide such a fuel element wherein the flow is subjected to turbulence i.e. disturbed, in order to reduce the flow resistance of the fuel element.

With the foregoing and other objects in view, there is provided in accordance with the invention, in a nuclear reactor-fuel element with cylindrical fuel rods and a fuel element skeleton formed of a head and a foot member and cylindrical control rod-guide tubes connecting the members, a plurality of mesh-forming spacing holder-grids for the fuel rods fastened to the guide tubes, the control rod-guide tubes being received, respectively, in the mesh formed by the spacing holder-grid, and flow guide means in vicinity of at least one of the spacing holder-grids largely closing, from a flow-technology standpoint, the cross section of the respective mesh surrounding the guide tube received therein i.e., that part of the cross section of the respective mesh that is not taken up by the guide tube. Due to the foregoing construction according to the invention, the quantity of coolant flowing in the vicinity of the unheated guide tube and consequently being less heated is diverted or turned toward the more intensely heated zones. Thus, more uniform heating of the coolant in the fuel element results therefrom. The flow guiding devices, which are not restricted, according to the invention, to a diversion of individual flow ribbons or filaments, can be formed not only of parts of the spacing holder-grid per se (integrated construction) or of additional members that are fastened to the spacing holder-grid, but also of flow guiding members that are associated with the guide tube. It is also conceivable, in accordance with the invention, that the guide tube per se is beefed-up or widened-out in vicinity of the spacing holder-grid or between the spacing holders in order to drive the flow away from the surroundings thereof. In every case, flow guiding devices according to the invention can be formed symmetrically with respect to the guide tube because, as noted hereinbefore, in contrast to the heretofore known state of the art, no unilateral (i.e., in one direction) diversion or deflection of flow ribbons or filaments of the coolant is contemplated.

In accordance with another feature of the invention, the flow guide means are formed by flow guide members mounted on the respective guide tube.

In accordance with a further and alternate feature of the invention, the flow guide means comprise devices integral with the spacing holder-grid, the respective mesh of which surrounds the guide tube.

In accordance with a concomitant feature of the invention, the nuclear reactor-fuel element includes additional flow guide means similar to the flow guide means in vicinity of the spacing holder-grids, the additional flow guide means being carried by the respective guide tube between two adjacent spacing holder grids.

The invention of the instant application is explained hereinafter with respect to various embodiments thereof wherein the mesh of the spacing holder-grid has a square cross section. However, the invention also applied to spacing holder-grids having a mesh of different cross section, for example an hexagonal disposition of the fuel rods and guide tubes. The invention has a special importance independently of the shape of the mesh, when the guide tube has a greater diameter than the normal fuel rods. The invention is therefore especially effective with conventional fuel elements with square spacing holder-grids wherein the mesh of the guide tube has four times the cross section of the mesh provided for the fuel rods.

The fuel elements of the invention of the instant application are not comparable to the conventional fuel elements such as those of the German Published Non-Prosecuted Application DT-OS 2 023 587 wherein the spacing holder-grid, with the aid of a sleeve surrounding the control rod guide tube, is fastened thereto. As shown especially in FIG. 5 of the foregoing German published non-prosecuted application, such a large cross section remains between the guide tube and the square mesh of the spacing holder-grid enclosing the guide tube, in all four corners of the mesh and directly adjacent the guide tube, that the effect of the sleeve upon the flow of the coolant can be considered as being virtually negligible.

Other features which are considered as characteristic for the invention are set forth in the appended claims.

Although the invention is illustrated and described herein as embodied in nuclear reactor-fuel element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
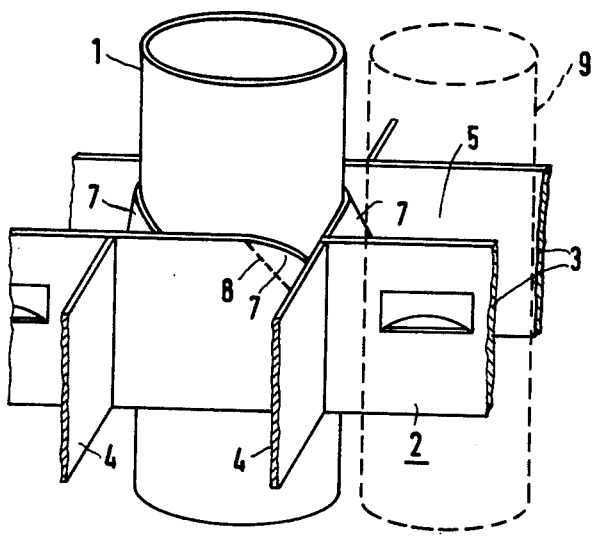
FIGS. 1 and 2 are respective fragmentary perspective and top plan views of one embodiment of a nuclear reactor fuel element constructed in accordance with the invention.

With respect to the foregoing figures of the drawings, the fuel element as a whole is of the general type shown in FIG. 1 of the hereinaforementioned U.S. Pat. No. 3,379,619 and repeated herein as FIG. 6.

Figure 2:
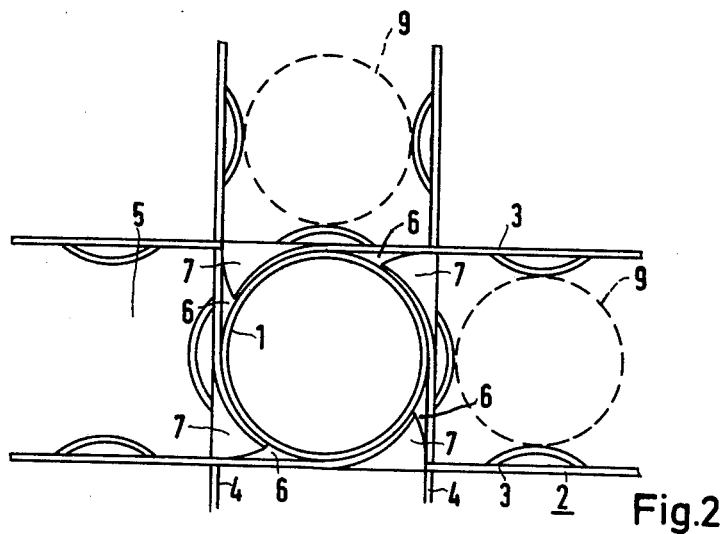

Referring now to the figures of the drawings herein and first especially to FIGS. 1 and 2 thereof, there is shown in the first embodiment of the invention a cylindrical control rod guide tube 1 surrounded by a fuel element-spacer grid 2 having rectilinear sheet-metal strips 3 and 4 extending perpendicularly to one another which form square mesh 5. As shown in FIG. 2, the tube 1 and the grid 2 enclose wedges 6 in the corners therebetween. In accordance with the invention, flaps or tabs 7 of the grid strips 3 and 4, which are bent out of the plane of the grid strips 3 and 4 about an edge 8 and which are accommodated to or match the tube 1 project into the wedge 6 as flow guidance devices. All four wedges 6 of the mesh 5 surrounding the guide tube 1 are thereby largely closed uniformly.

The flaps 7 do not to engage the tube 1 directly. It can be sufficient, for example, if the normally open cross-sectional opening of the wedge 6 is three-fourths or four-fifths closed thereby. Generally, the otherwise open cross section of the wedge 6 will, however, be virtually completely closed. It is recommended only that rubbing or brushing of the flaps 7 against the tube 1 be avoided by providing a slight spacing of several tenths of a millimeter therebetween. Altogether, the flow should, however, be throttled by the closure of the wedge opening 6 to such an extent only that the heating of coolant in the vicinity of the control rod-guide tube 1 be not considerably less than in vicinity of the fuel rods 9, shown only in broken lines, which extend parallel to the guide tube 1.

Figure 3:
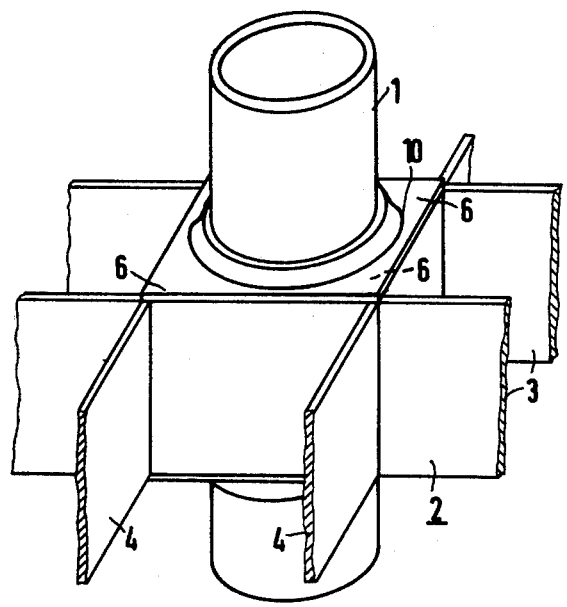
FIGS. 3 and 4 are views similar to those of FIGS. 1 and 2, respectively, of another embodiment of the invention.
Figure 4:
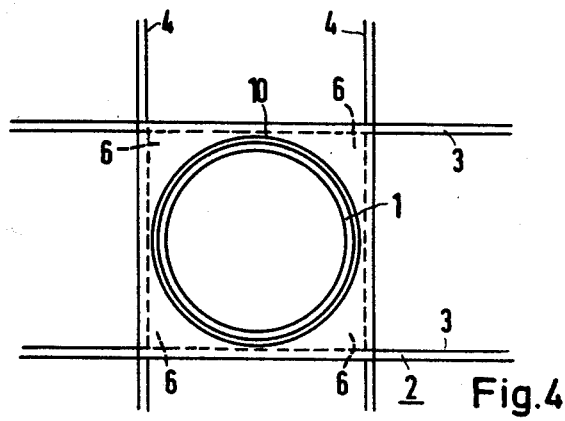

In the embodiment of FIGS. 3 and 4, the control rod-guide tube 1, above and below the spacing holder-grid 2, is surrounded by two similar flow guide members 10 that are, however, disposed inverted with respect to one another, the flow guide members 10 being slid onto the tube 1 and, under certain conditions, being able to serve as holders of the grid 2. The flow guide members 10 completely block the flow through cross section provided by the open wedges 6 between the guide tube 1 and the mesh 5 of the grid 2 wherein the guide tube 1 is received. Consequently, the effect aimed at by the invention is also attained by the embodiment thereof shown in FIGS. 3 and 4, namely that the flow of coolant in vicinity of the control rod-guide tube 1 is diminished to the required extent. Under certain conditions, only one of the two similarly symmetrically constructed and disposed flow guide members 10 may suffice for this purpose.

The flow guide members 10, just as was described hereinbefore with respect to the embodiment of FIGS. 1 and 2, can also partially close off the mesh 5 in the spacing holder-grid 2 surrounding the guide tube 1. The flow guide members 10 can, furthermore, also be provided between two adjacent spacing holder-grids 2 at one or more locations of the guide tube 1, so that also at those locations i.e., over greater portions of the length of the guide tube 1, than only in vicinity of the spacing holder-grid 2, the flow in vicinity of the unheated guide tube 1 is reduced.

Figure 5:
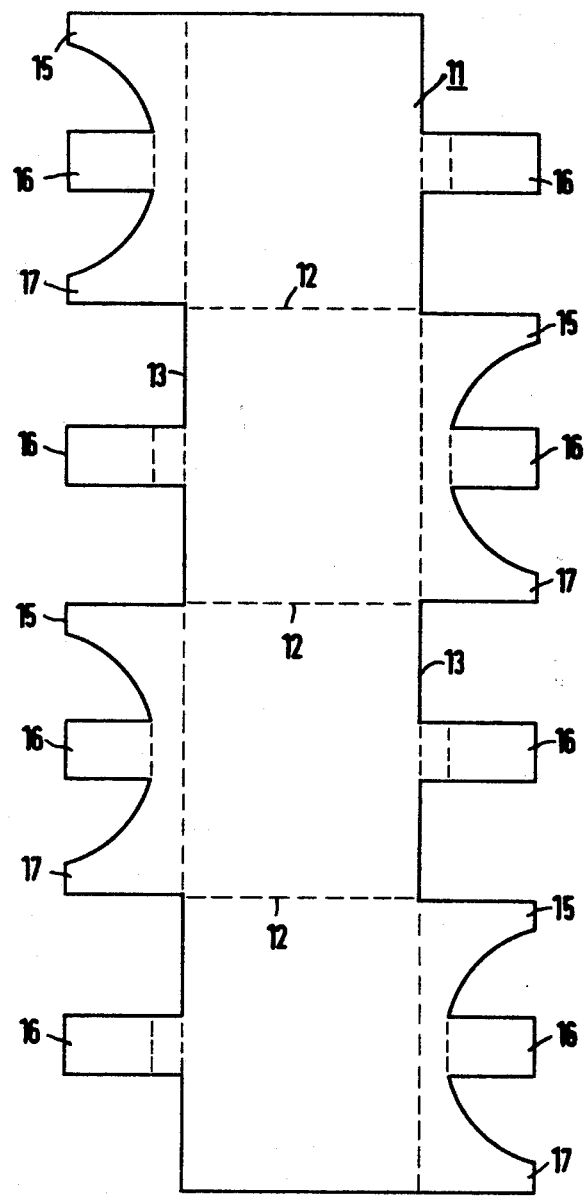
FIG. 5 is a blank from which part of a third embodiment of the invention, namely the spacing holder-grid thereof, is formed.

A further embodiment of the invention is indicated in FIG. 5 which shows as a blank a sheetmetal strip 11 forming the spacing holder-grid 2. The sheetmetal strip 11 is subsequently bent perpendicularly to the edges 12 shown in broken lines, so that the strip 11 alone forms a mesh 5 of the spacing holder-grid 2. Individual grid mesh 5 are then connected to one another. It is noted that additional flaps 15, 16 and 17 are provided at the edges 13 of the sheetmetal strip 11, the width of which corresponds to the height of the sheetmetal strips 3 and 4 shown in FIGS. 1 and 4. The flaps 16 serve for spacing the guide tube 1 (FIG. 1), while the flaps 15 and 17 serve for blocking the coolant flow in accordance with the invention. For this purpose, the flaps 15 and 17 are bent at an angle of 90°, for example, or also at a smaller angle, if necessary, out of the plane of the drawing of FIG. 5, either before or after the sheetmetal strips 11 have been assembled so that the flaps 15 and 17 block to a desired extent the open wedges 6 formed between the guide tube 1 and the mesh 5 of the spacing holder-grid 2 surrounding the guide tube 1. In the embodiment of FIG. 5, the flaps 15, 16 and 17 are provided at both marginal edges 13 of the sheetmetal strip 11. It may be entirely sufficient, however, to locate the guide devices i.e., the flaps 15, 16 and 17 only on one marginal edge 13 of the sheetmetal strip 13.

In all the embodiments of the invention described hereinbefore, only the space between the guide tube 1 and the mesh 5 surrounding the tube 1 has been blocked from the flow technology standpoint. It may be advisable in special cases, however, to extend the blockage or closure also to adjacent mesh. For this purpose, the flow guide devices i.e., the flaps, can be made effective over a greater area than that corresponding to the cross section of the mesh surrounding the guide tube.

Figure 6:
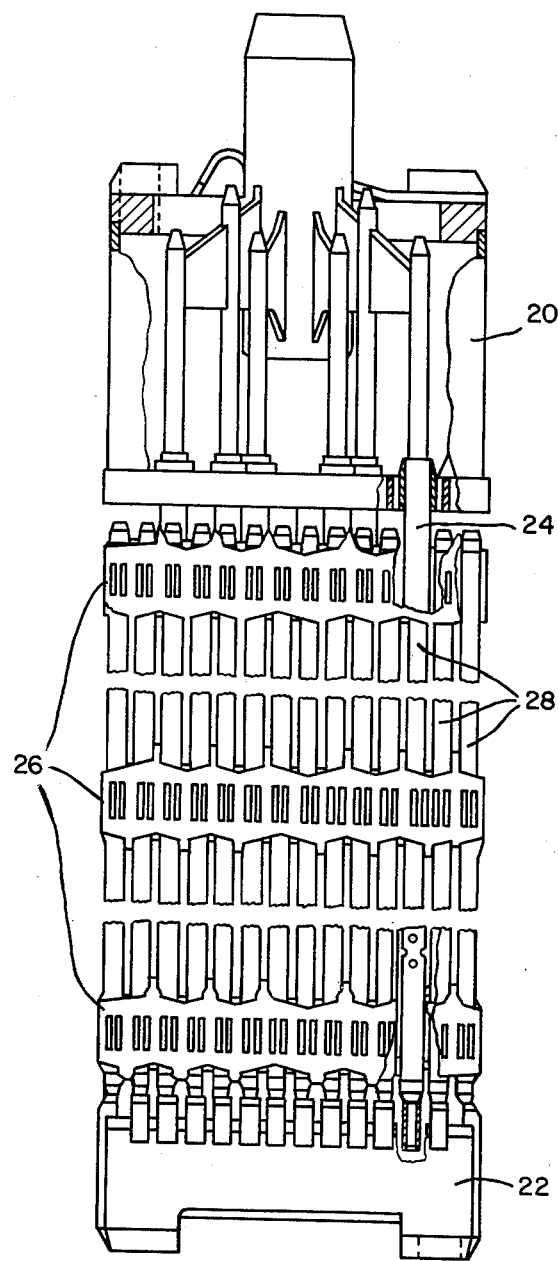

In FIG. 6, as aforementioned, a fuel element such as that shown in U.S. Pat. No. 3,379,619, is illustrated. As shown in FIG. 6, the fuel element has a skeleton formed of a head member 20 and a foot member 22 and a plurality of cylindrical control rod-guide tubes 24 connecting the head and foot members 20 and 22, respectively. Also, secured to the guide tubes 24 are a plurality of longitudinally spaced grids 26 for an array of fuel rods 28. For a more-detailed description of such a fuel element, reference may be made to the aforementioned U.S. Pat. No. 3,379,619. The mesh-forming spacing holder-grids 2 of the instant application, as shown in FIGS. 1 to 5 herein, offer marked improvements, as noted hereinbefore, over the grides 26 of the aforementioned U.S. Pat. No. 3,379,619.

There are claimed:

1. In a nuclear reactor-fuel element with cylindrical fuel rods and a fuel element skeleton formed of a head and foot member and cylindrical control rod-guide tubes connecting said members, a plurality of mesh-forming spacing holder-grids for the fuel rods fastened to the guide tubes, the control rod-guide tubes being received in respective mesh formed by said spacing holder-grids, the respective mesh wherein the control rod-guide tubes are received having a given flow cross section surrounding the respective guide tubes, and flow guide means closing at least three-fourths of the flow cross section of the respective mesh surrounding the guide tube received therein.

2. Nuclear reactor-fuel element according to claim 1 wherein said flow guide means are formed by flow guide members mounted on the respective guide tube.

3. Nuclear reactor-fuel element according to claim 1 wherein said flow guide means comprise devices integral with the spacing holder-grid, the respective mesh of which surrounds the guide tube.

4. Nuclear reactor-fuel element according to claim 1 including additional flow guide means carried by the respective guide tube between two adjacent spacing holder-grids.

5. Nuclear reactor-fuel element according to claim 1 wherein said flow guide means closes less than all of the flow cross section.

6. Nuclear reactor-fuel element according to claim 1 wherein said flow guide means closes up to four-fifths of the flow cross section.

7. Nuclear reactor-fuel element according to claim 1 wherein said flow guide means completely block the flow cross section.

8. Nuclear reactor-fuel element according to claim 1 wherein said flow guide means are formed by at least one guide member mounted on the respective guide tube and in engagement with one of said spacing holder-grids.

9. Nuclear reactor-fuel element according to claim 1 wherein said spacing holder-grids are mutually spaced in axial direction of the respective guide tube and wherein said flow guide means are formed by at least one guide member mounted on the respective guide tube and disposed between said mutually spaced spacing holder-grids.

* * * * *